(12) United States Patent
Zenju

(10) Patent No.: US 9,088,488 B2
(45) Date of Patent: Jul. 21, 2015

(54) INFORMATION PROCESSING APPARATUS, CONTROL METHOD THEREFOR, IMAGE PROCESSING APPARATUS, AND CONTROL METHOD THEREFOR

(75) Inventor: Naomi Zenju, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 986 days.

(21) Appl. No.: 12/707,482

(22) Filed: Feb. 17, 2010

(65) Prior Publication Data

US 2010/0208301 A1   Aug. 19, 2010

(30) Foreign Application Priority Data

Feb. 18, 2009   (JP) ................................. 2009-035402

(51) Int. Cl.
| | |
|---|---|
| G06F 15/00 | (2006.01) |
| H04L 12/24 | (2006.01) |
| H04L 29/12 | (2006.01) |
| H04N 1/00 | (2006.01) |
| H04N 1/32 | (2006.01) |

(52) U.S. Cl.
CPC ...... *H04L 41/0806* (2013.01); *H04L 29/12207* (2013.01); *H04L 61/20* (2013.01); *H04N 1/00244* (2013.01); *H04N 1/32117* (2013.01); *H04N 2201/0094* (2013.01); *H04N 2201/3208* (2013.01); *H04N 2201/3278* (2013.01)

(58) Field of Classification Search
CPC .............. G06F 3/1296; H04N 1/00204; H04L 29/12207; H04L 41/0806
USPC ............................................ 358/1.15; 714/57
See application file for complete search history.

(56) References Cited

U.S. PATENT DOCUMENTS

| | | | | |
|---|---|---|---|---|
| 2002/0033961 | A1* | 3/2002 | Murphy | 358/1.15 |
| 2005/0270586 | A1* | 12/2005 | Hashimoto | 358/400 |
| 2008/0158581 | A1* | 7/2008 | Ferlitsch | 358/1.13 |
| 2008/0250277 | A1* | 10/2008 | Yoshida et al. | 714/57 |

FOREIGN PATENT DOCUMENTS

JP   2005-333352 A   12/2005

* cited by examiner

*Primary Examiner* — Saeid Ebrahimi Dehkord
(74) *Attorney, Agent, or Firm* — Rossi, Kimms & McDowell LLP

(57) ABSTRACT

An information processing apparatus that is capable of saving user's trouble when setting an address of a connection target and capable of providing an ease-of-use environment for setting the address. A first receiving unit receives an address of an image processing apparatus transmitted from the image processing apparatus connected to the network through the network. A second receiving unit receives specific information that requires a reception of an address transmitted from an image processing apparatus connected by a predetermined cable via the predetermined cable. A setting unit sets up the address received by the first receiving unit in a case that the specific information is received by the second receiving unit. A transmission unit transmits its own address with the address set up by the setting unit being destination.

4 Claims, 12 Drawing Sheets

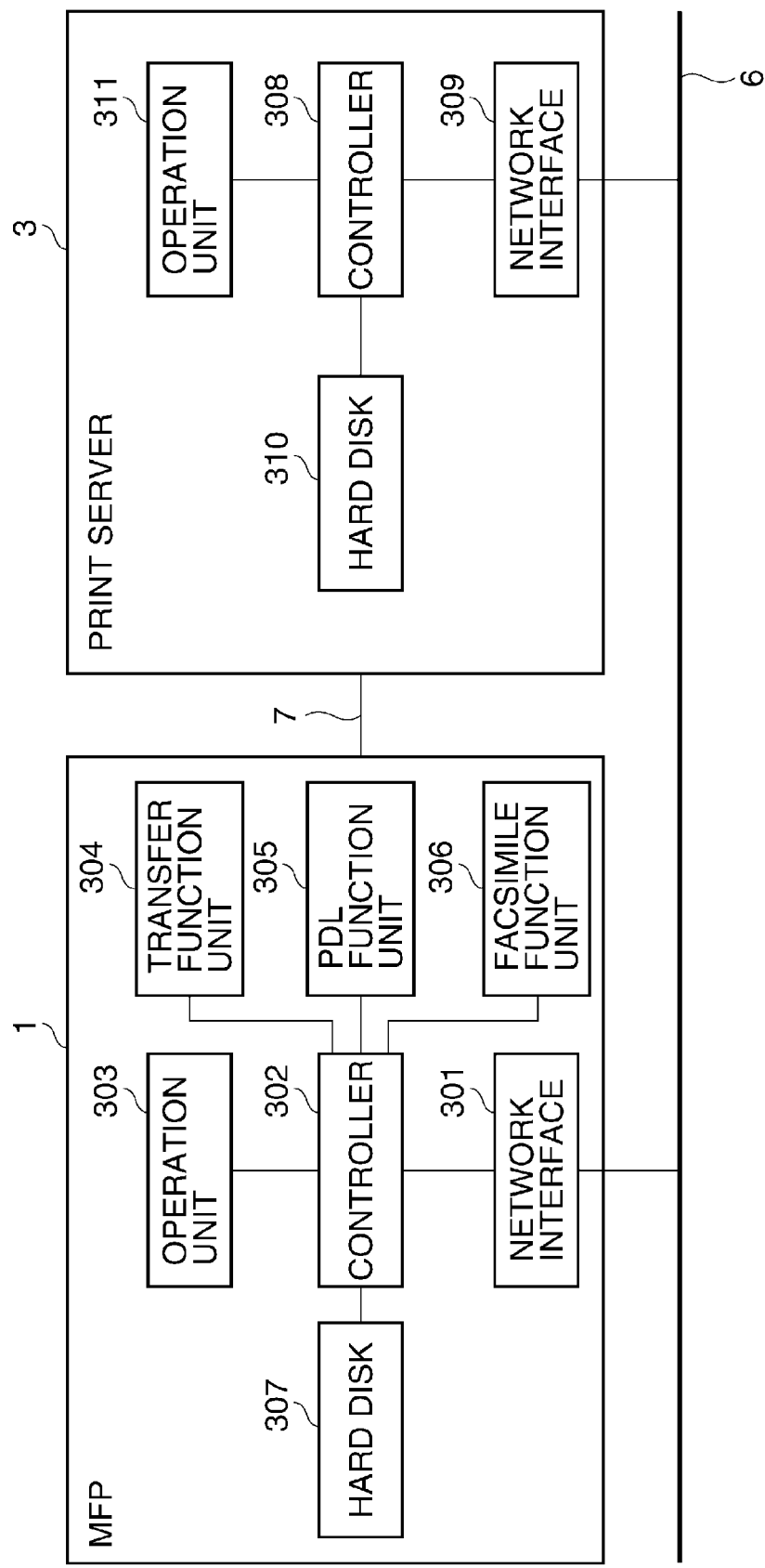

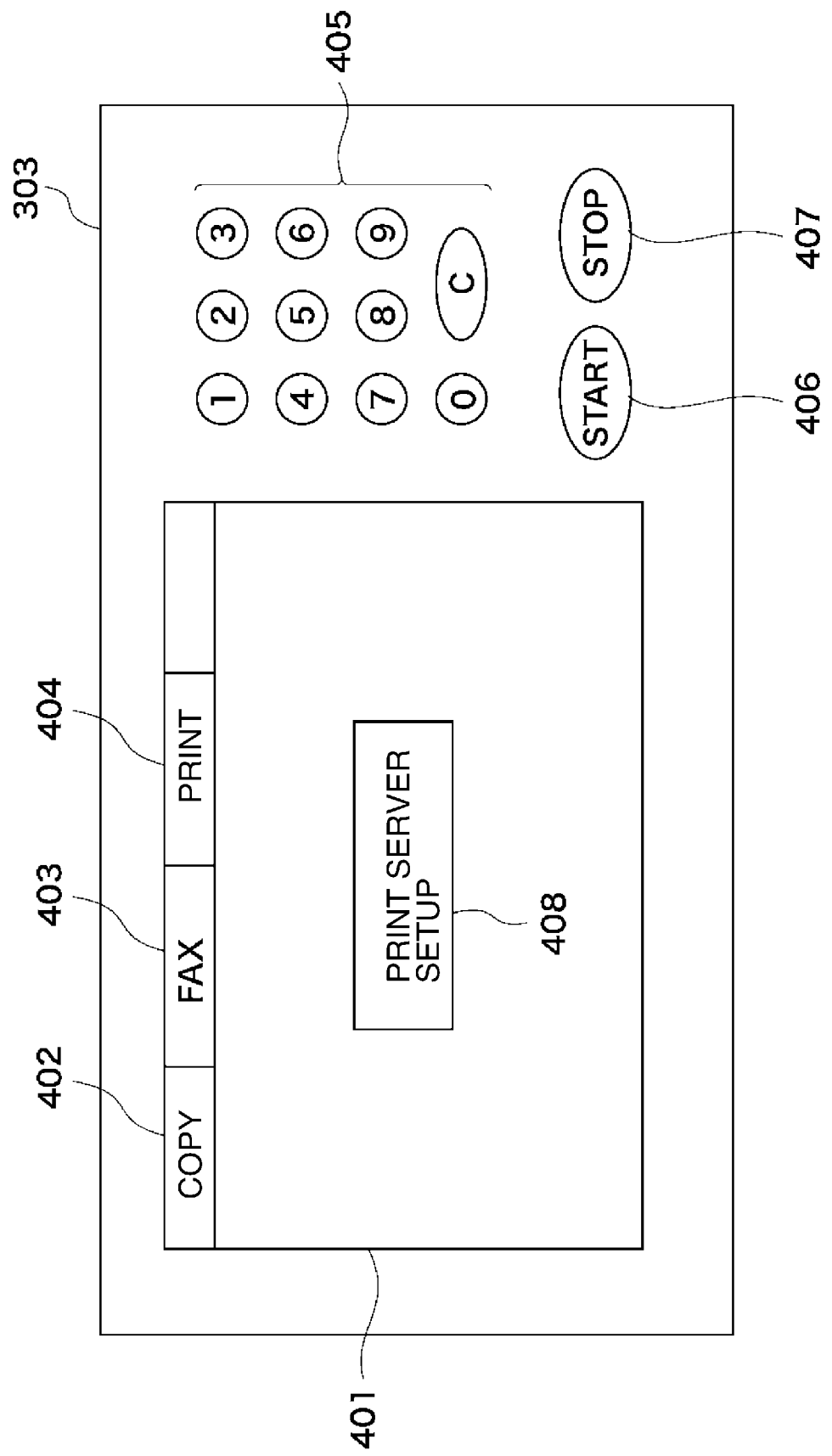

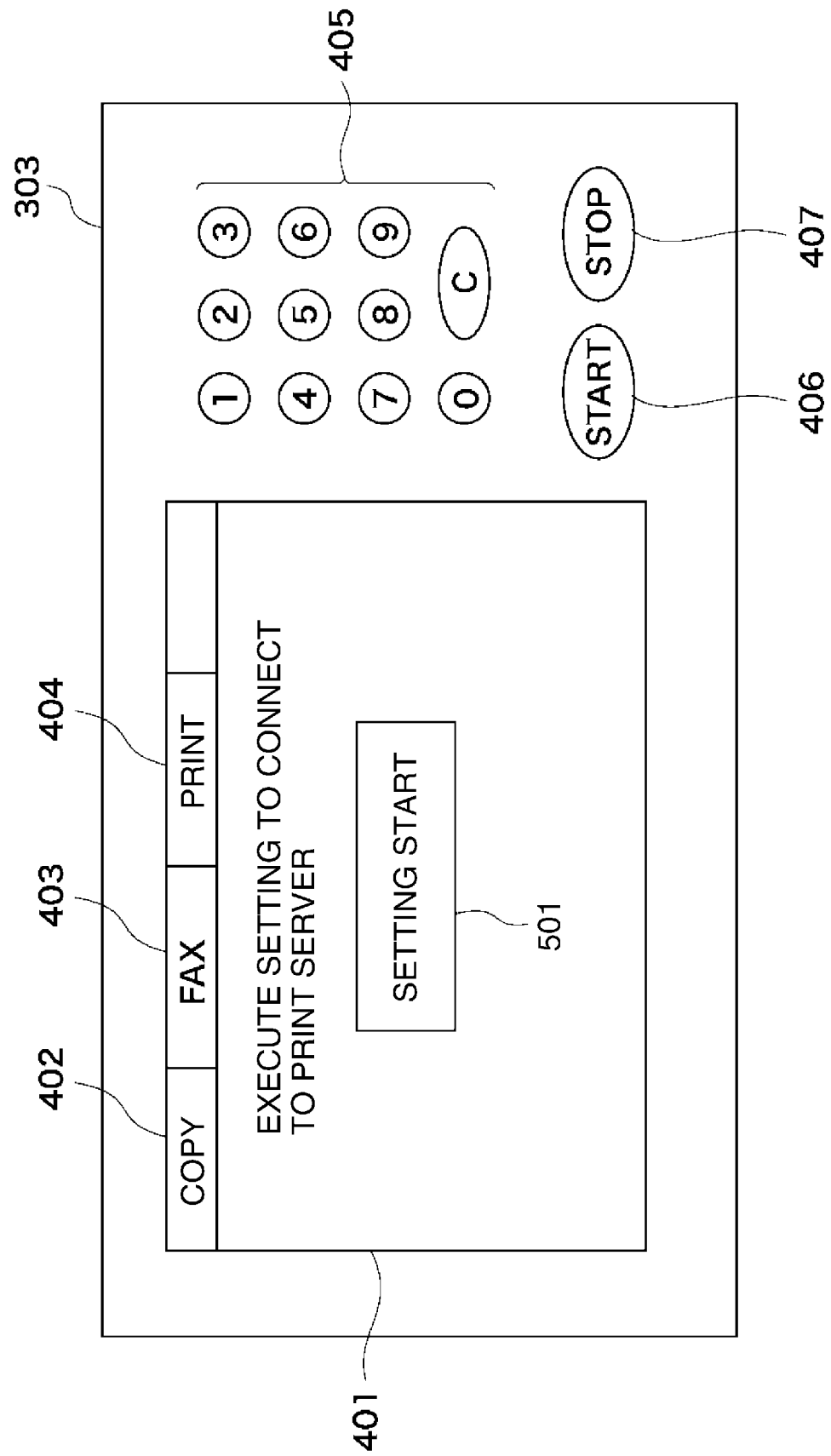

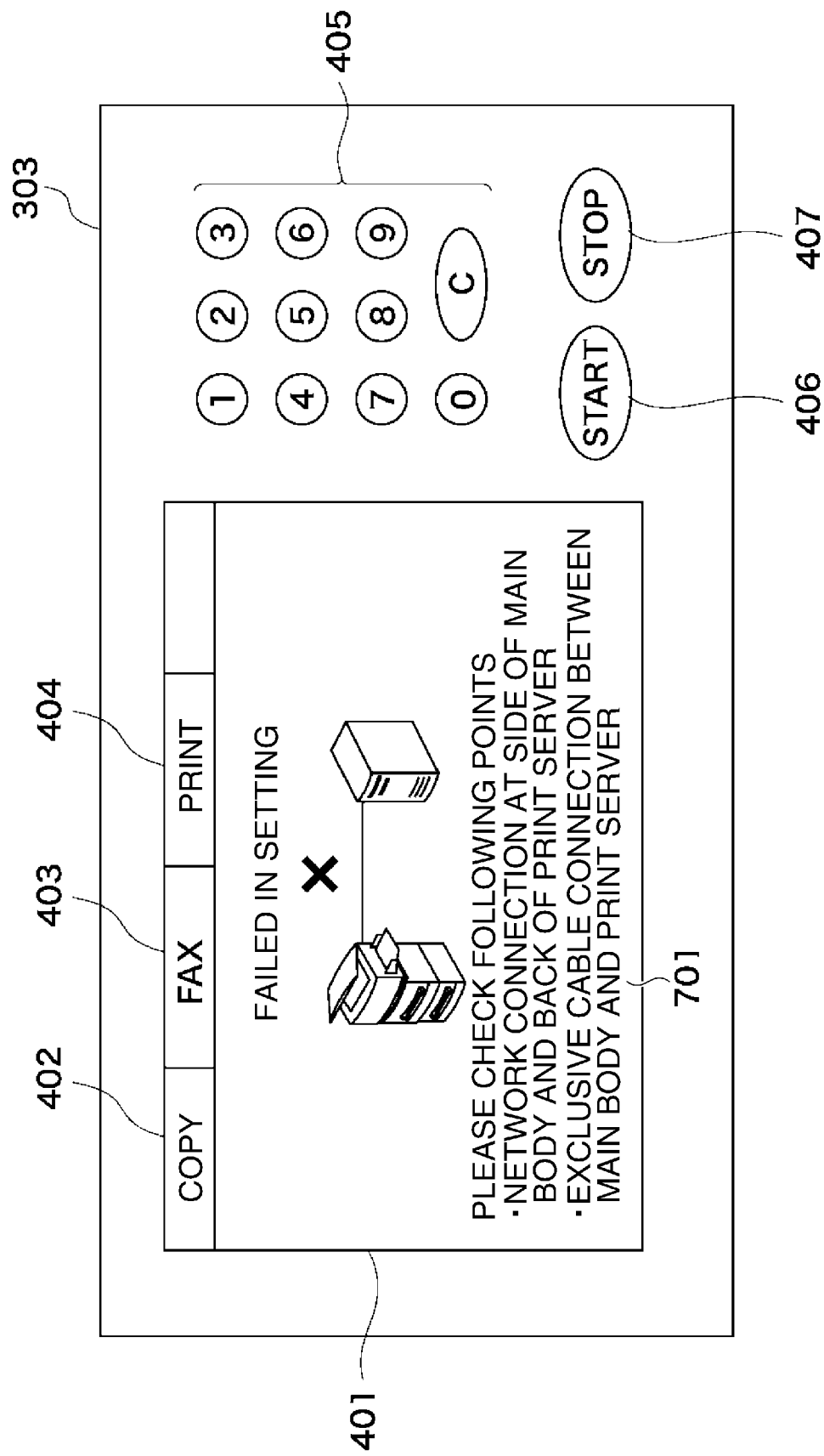

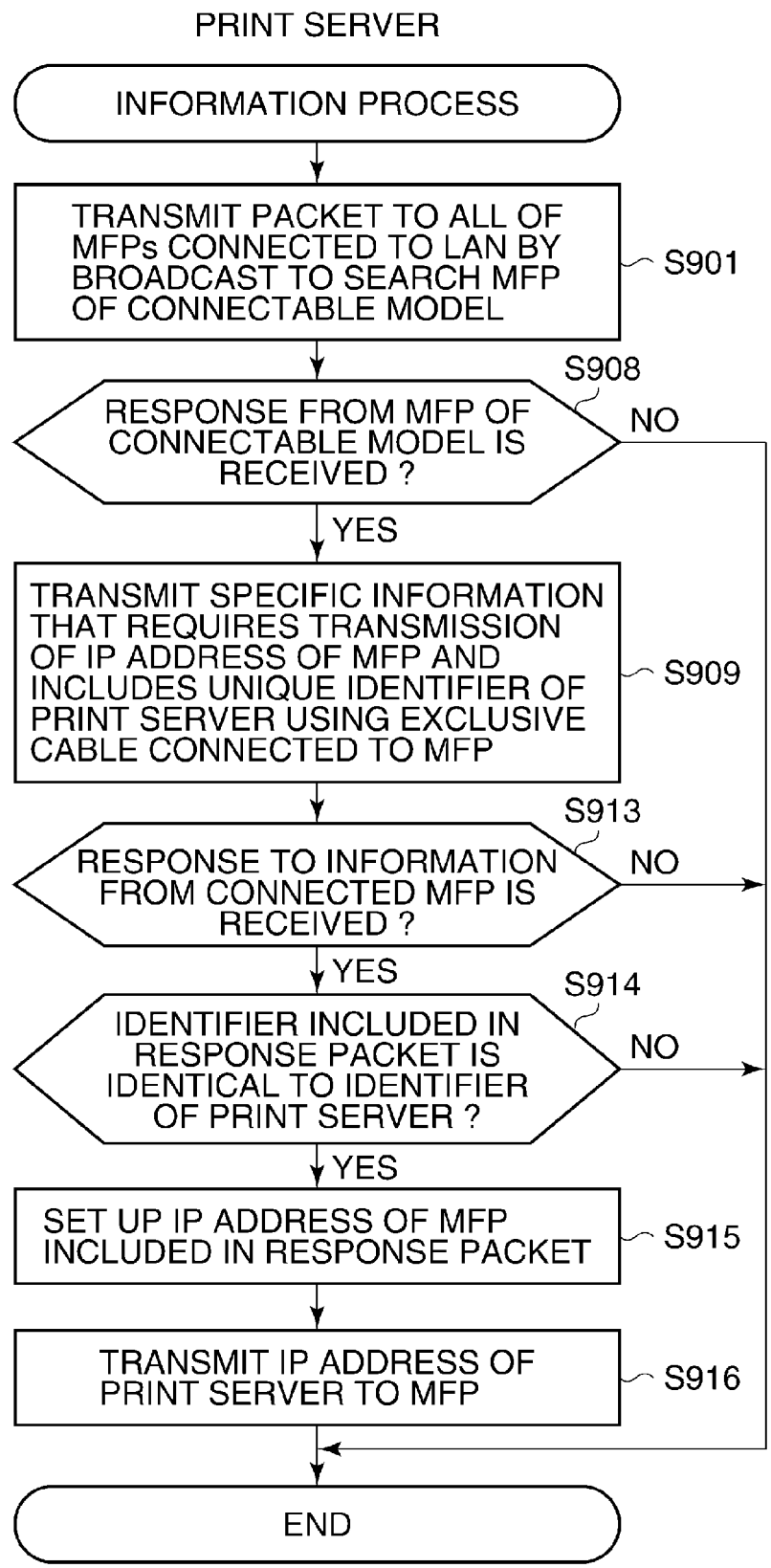

INFORMATION PROCESSING APPARATUS, CONTROL METHOD THEREFOR, IMAGE PROCESSING APPARATUS, AND CONTROL METHOD THEREFOR

BACKGROUND OF THE INVENTION

1. Field of the Invention

The present invention relates to an information processing apparatus and a control method therefor, and an image processing apparatus and a control method therefor. Particularly, the present invention relates to an information processing apparatus and a control method therefor, and an image processing apparatus and a control method therefor that are characterized in a technique for setting an IP address when the information processing apparatus connects to the image processing apparatus.

2. Description of the Related Art

Conventionally, when a user performs image forming in a network image forming system, the user selects a printer to output an image on a computer and makes the selected printer output an image through an interface such as a local area network (LAN).

Moreover, a form in which a job transmitted by a user is sent to a multifunction printer (MFP) via a print server is also known widely. Since the job is transmitted via the print server, additional functions such as a high-speed image processing function, and a function to improve security can be added to the printer.

The MFP and the print server are connected via the LAN. In many cases, the MFP and the print server are separately connected by an exclusive cable for a video-data transfer.

In the environment of the TCP/IP protocol, when connecting the print server to the MFP, it is necessary to set up IP addresses mutually. Conventionally, an installation person or an administrator has set up the IP address manually at the time of first connection.

Moreover, when the print server and the MFP are connected to the LAN, it is also considered that the IP addresses are assigned automatically by introducing a DHCP technique, for example. However, in that case, the print server and the MFP cannot know the mutual IP addresses automatically. So, whenever IP addresses are assigned, the installation person or the administrator needs to check the IP addresses, and needs to perform connection settings manually, which increases in complexity.

Therefore, a technique by which the print server and the MFP automatically recognize the mutual IP addresses and set the mutual IP addresses is required.

In a conventional technique to set an IP address automatically, an MFP transmits a broadcast packet that includes a response request to a print server, the print server sets up by receiving the response from the MFP, and an administrator is notified automatically by an e-mail or the like (see Japanese laid-open patent publication (Kokai) No. 2005-333352 (JP2005-333352A)).

However, in this technique, when there are a plurality of MFPs to which the print server can connect, an MFP other than a target MFP to set up a connection actually may receive and respond to the response request and may set up a connection.

SUMMARY OF THE INVENTION

The present invention provides an information processing apparatus and a control method therefor, an image processing apparatus and a control method, which are capable of saving user's trouble when setting an address of a connection target and capable of providing an ease-of-use environment for setting the address.

Accordingly, a first aspect of the present invention provides an information processing apparatus that is installed in a network in which an image processing apparatus is installed and extends a function of the image processing apparatus, comprising a first receiving unit adapted to receive an address of an image processing apparatus transmitted from the image processing apparatus connected to the network through the network, a second receiving unit adapted to receive specific information that requires a reception of an address transmitted from an image processing apparatus connected by a predetermined cable via the predetermined cable, a setting unit adapted to set up the address received by said first receiving unit in a case that the specific information is received by said second receiving unit, and a transmission unit adapted to transmit its own address with the address set up by said setting unit being destination.

Accordingly, a second aspect of the present invention provides an image processing apparatus that is installed in a network in which an information processing apparatus is installed and a function is extended by the information processing apparatus, comprising a first transmission unit adapted to transmit specific information that requires a reception of an address of the image processing apparatus to an information processing apparatus connected by a predetermined cable via the predetermined cable, a second transmission unit adapted to transmit the address of the image processing apparatus to the network, a receiving unit adapted to receive an address of the information processing apparatus connected by the predetermined cable transmitted by the information processing apparatus with the address transmitted by said second transmission unit via the network being destination, and a setting unit adapted to set up the address of the information processing apparatus received by said receiving unit.

Accordingly, a third aspect of the present invention provides an information processing apparatus that is installed in a network in which an image processing apparatus is installed and extends a function of the image processing apparatus, comprising a first transmission unit adapted to transmit search information including an address of the information processing apparatus in order to search an image processing apparatus connected to the network, a first receiving unit adapted to receive a response to the search information transmitted by said first transmission unit, a second transmission unit adapted to transmit specific information that requires a transmission of an address of the image processing apparatus including a unique identifier to the image processing apparatus connected by a predetermined cable when said first receiving unit receives the response, a second receiving unit adapted to receive the response from the image processing apparatus to the specific information transmitted by said second transmission unit, a determination unit adapted to determine whether the identifier included in the response received by said second receiving unit is identical to the identifier that is issued by the information processing apparatus, a setting unit adapted to set up the address of the image processing apparatus in a case that said determination unit determines that the identifier included in the response is identical to the identifier that is issued by the information processing apparatus, and a third transmission unit adapted to transmit the address of the information processing apparatus with the address set up by said setting unit being destination.

Accordingly, a fourth aspect of the present invention provides an image processing apparatus that is installed in a network in which an information processing apparatus is installed and a function is extended by the information processing apparatus, comprising a first receiving unit adapted to receive search information that is used to search an image processing apparatus and includes an address of the information processing apparatus, a first holding unit adapted to hold the search information received by said first receiving unit, a determination unit adapted to determine whether the information processing apparatus is connectable or not based on the search information held by said first holding unit, a first transmission unit adapted to transmit a response to the search information to the information processing apparatus when said determination unit determines that the information processing apparatus is connectable, a second receiving unit adapted to receive specific information that requires a transmission of an address of the image processing apparatus including a unique identifier issued by the information processing apparatus from the information processing apparatus connected by a predetermined cable via the predetermined cable, a second holding unit adapted to hold the unique identifier, a second transmission unit adapted to transmit the address of the image processing apparatus with the unique identifier held by said second holding unit to the address of the information processing apparatus included in the search information held by said first holding unit, a third receiving unit adapted to receive the address of the information processing apparatus transmitted from the information processing apparatus with the address of the image processing apparatus to which said second transmission unit transmits being destination, and a setting unit adapted to set up the address of the information processing apparatus received by said third receiving unit.

According to the information processing apparatus of the present invention, user's trouble when setting the address of the connection target can be saved and the ease-of-use environment for setting the address can be provided.

Further features of the present invention will become apparent from the following description of exemplary embodiments with reference to the attached drawings.

BRIEF DESCRIPTION OF THE DRAWINGS

FIG. 3 is a block diagram schematically showing internal configurations of an MFP and a print server in FIG. 1.

FIG. 4 is a view showing a first display example of an operation unit of the MFP in FIG. 3.

FIG. 5 is a view showing a second display example of the operation unit of the MFP in FIG. 3.

FIG. 7 is a view showing a third display example of the operation unit of the MFP in FIG. 3.

FIG. 9A is a flowchart showing procedures of an information process executed by the print server in FIG. 8.

DESCRIPTION OF THE EMBODIMENTS

Hereafter, embodiments according to the present invention will be described in detail with reference to the drawings.

Figure 1:
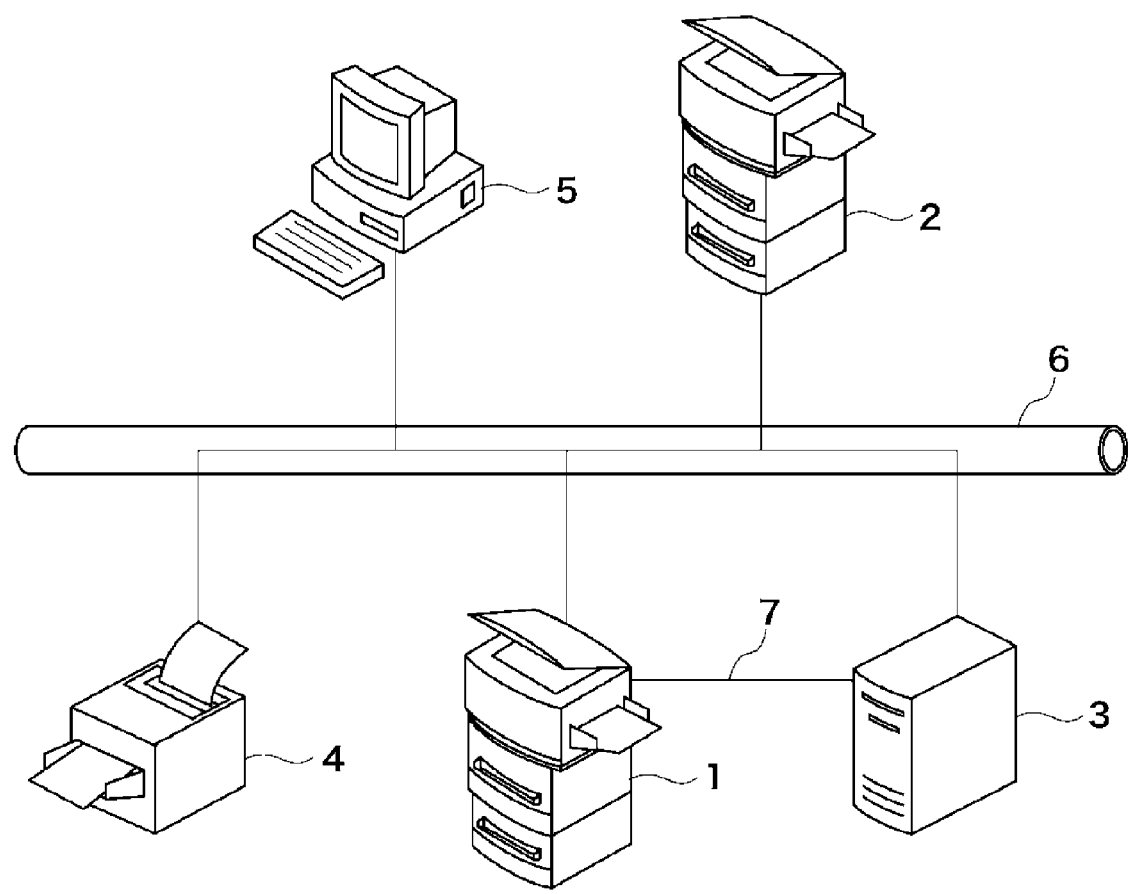
FIG. 1 is a configuration view schematically showing a network system in which an information processing apparatus and an image processing apparatus concerning a first embodiment of the present invention are connected to a network.

FIG. 1 is a configuration view schematically showing a network system in which an information processing apparatus and an image processing apparatus concerning a first embodiment of the present invention are connected to a network.

This network system is provided with multifunction printers (MFPs) 1 and 2 as image processing apparatuses provided with functions such as a print function, a copy function, a facsimile function, and a scan function.

Moreover, this network system is provided with a print server 3 as the information processing apparatus that extends the functions of the MFP 1 by cooperating with the MFP 1, a printer 4, and an information terminal 5 such as a PC. These are mutually connected via a network 6 such as the Ethernet (registered trademark).

The information terminal 5 is accessible to the printer 4, the MFPs 1 and 2, and the print server 3 via the network 6. The MFP 1 and the print server 3 are connected by an exclusive cable 7 for transmitting and receiving image data and control signals.

Figure 2:
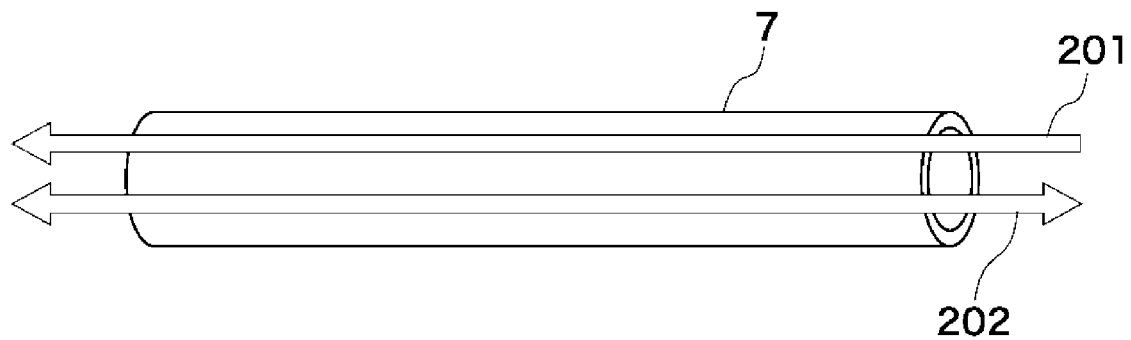
FIG. 2 is a conceptual view of an exclusive cable shown in FIG. 1.

FIG. 2 is a conceptual view of the exclusive cable 7 shown in FIG. 1.

The exclusive cable 7 has a data transfer signal line 201 and a control signal line 202. The exclusive cable 7 can transmit and receive signals at a higher speed as compared with the network 6.

Although the MFP 1 and the print server 3 are independent in FIG. 1, the MFP 1 and the print server 3 may be unified.

FIG. 3 is a block diagram schematically showing internal configurations of the MFP 1 and the print server 3 in FIG. 1.

In FIG. 3, the MFP 1 is provided with a network interface 301 connected to the network 6, and a controller 302 that connects to components of the MFP 1 to control operations of the components and to control data transfer among the components.

The MFP 1 is also provided with an operation unit 303, which comprises a touch-panel LCD, LEDs, buttons, etc., and a transfer function unit 304, that achieves a transfer function for converting a paper original into image data after scanning and transferring the image data to external devices via the network interface 301.

The MFP 1 is also provided with a PDL function unit 305 that achieves a PDL function for converting print data received from the external devices via the network interface 301 into image data and for printing the image data onto a recording paper.

Further, the MFP 1 is provided with a facsimile function unit 306 that achieves the facsimile function to communicate with an external FAX machine, and a hard disk 307 that can save various setting values, operation history information, image data, etc.

The transfer function unit 304, the PDL function unit 305, and the facsimile function unit 306 are not indispensable, and can be selected by a user.

The print server 3 can add a function to improve security, a function of a high-speed image process, a storage function to save large amounts of image data, etc. to the MFP 1, for example.

The print server 3 can be controlled by the operation unit 303 of the MFP 1, allows key inputs from the operation unit 303 of the MFP 1 to the print server 3, and can display a condition of the print server 3 on the operation unit 303 of the MFP 1.

The print server 3 is provided with a controller 308, a network interface 309, a hard disk 310, and an operation unit 311 in the same manner as the MFP 1.

In FIG. 3, the MFP 1 and the print server 3 are connected via the network 6, and the exclusive cable 7 makes a connection between the MFP 1 and the print server 3.

FIG. 4 is a view showing a first display example of the operation unit 303 of the MFP 1 in FIG. 3.

In FIG. 4, the operation unit 303 is a display device, and is provided with an LCD panel 401 that is a touch panel operatable as buttons, a copy button 402, a FAX button 403, and a print button 404 that are used to select one from three modes of a copy, a facsimile, and a print.

The operation unit 303 is also provided with a ten-digit keypad 405 for inputting a numeral, a start button 406 for starting an operation in each mode, and a stop button 407 for stopping an operation in action.

When one of the copy button 402, the FAX button 403, and the print button 404 is pressed, a screen of the mode corresponding to the pressed button is displayed on the LCD panel 401.

For example, if the print button 404 is pressed, a screen that includes a print server setup button 408 is displayed as shown in FIG. 4. Further, if the print server setup button 408 is pressed, a screen shown in FIG. 5 is displayed.

FIG. 5 is a view showing a second display example of the operation unit 303 of the MFP 1 in FIG. 3.

When a setting start button 501 for starting a connection setup in the screen of FIG. 5 is pressed, a process for setting IP addresses of the MFP 1 and the print server 3 mutually automatically starts. Flowcharts of the process started at the time are shown in FIG. 6A and FIG. 6B.

Figure 6A:
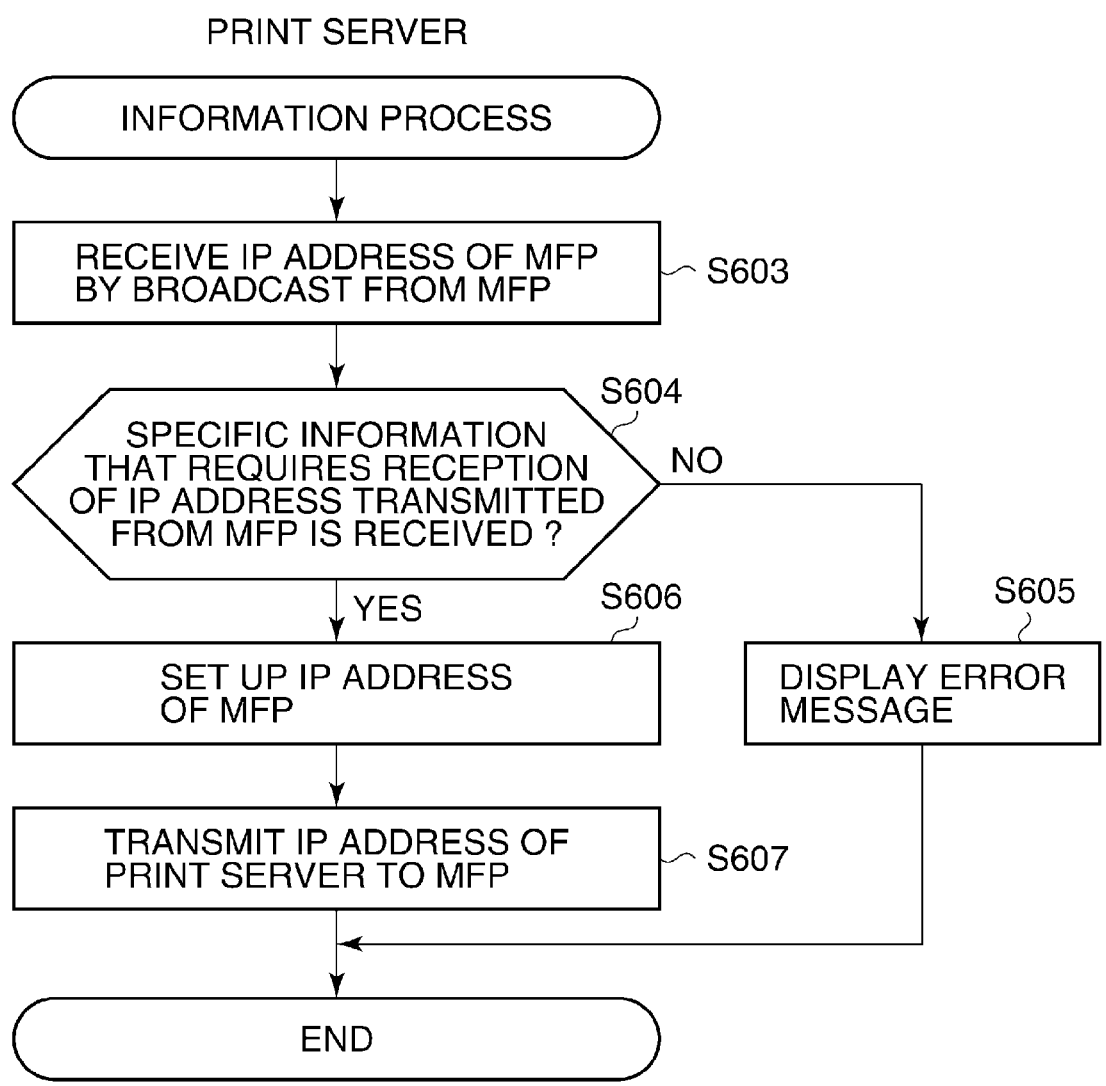
FIG. 6A is a flowchart showing procedures of an information process executed by the print server in FIG. 1.
Figure 6B:
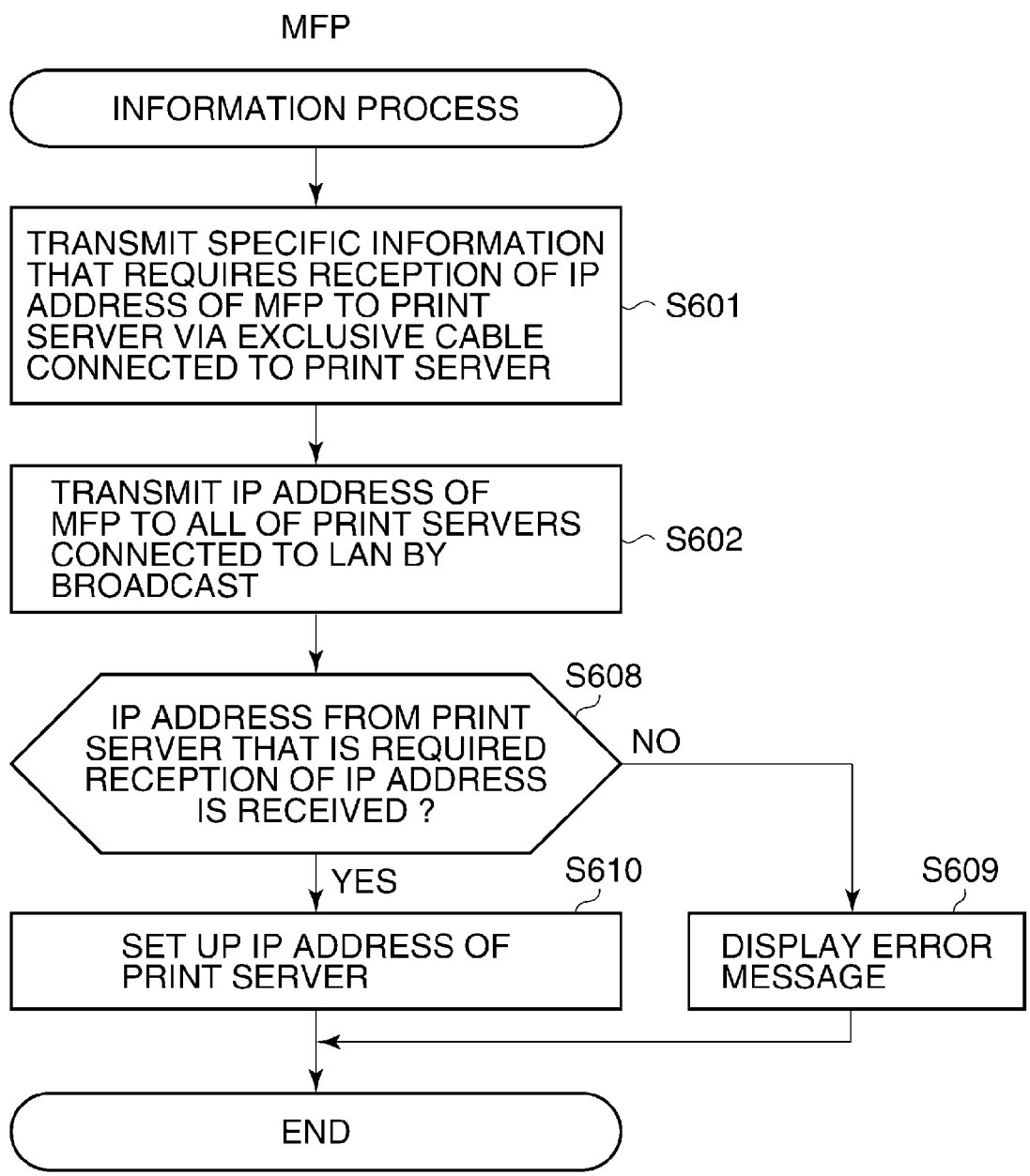
FIG. 6B is a flowchart showing procedures of an information process executed by the MFP in FIG. 1.

FIG. 6A and FIG. 6B are flowcharts showing procedures of processes executed by the print server 3 and the MFP 1 in FIG. 1.

FIG. 6A and FIG. 6B show the processes for automatically setting the mutual IP addresses so that the print server 3 can correctly communicate with the MFP 1 in the case when the print server 3 is newly installed into the environment where the MFP 1 has already worked in the network 6 and is connected with the MFP 1 by the exclusive cable 7.

It is assumed that the MFP 1 and the print server 3 have already acquired the IP addresses individually. When there is a DHCP server on the network 6, the IP addresses are automatically assigned from the DHCP server. Fixed IP addresses may be assigned to the MFP 1 and the print server 3 beforehand.

The controller 302 of the MFP 1 (referred to as the MFP 1, hereinafter) transmits specific information that requires a reception of the IP address of the MFP 1 to the print server 3 using the exclusive cable 7 used for connection with the print server 3 (step S601). The specific information shows that the MFP 1 will transmit the IP address by a broadcast packet in step S602 beforehand so that the print server 3 receives the IP address correctly.

As a concrete transmission method in the step S601, a method of transmitting fixed data via the data transfer signal line 201 assigned in the exclusive cable 7 of FIG. 2 mentioned above, a method of transmitting information by varying a signal level in the control signal line 202, etc. can be adopted. It should be noted that the process in the step S601 is executed when the user presses the button 501 in FIG. 5 mentioned above.

Next, the MFP 1 transmits the broadcast packet including the IP address of the MFP 1 (step S602). The broadcast packet transmitted at the time is transmitted not only to the print server 3 but also to the MFP 2, the printer 4, and the information terminal 5 that are connected to the network 6. A reason why the IP address is transmitted using the broadcast packet is because the MFP 1 does not know the IP address of the print server 3 yet at this time. However, another transmission method such as a multicasting other than the broadcast may be used.

In step S603, the print server 3 receives the IP address of the MFP 1 that has been transmitted by the MFP 1. The MFP 2, the printer 4, and the information terminal 5 that are connected to the network 6 also receive the IP address of the MFP 1.

However, since only the print server 3 has received the specific information that requires the reception of the IP address of the MFP 1 transmitted by the MFP 1, it is determined that the process proceeds to a step (step S606) for setting the IP address of the MFP 1 in step S604. The apparatuses other than the print server 3 do not proceeds to the step for setting the IP address of the MFP 1.

Receiving the IP address of the MFP 1, the print server 3 sets up the IP address of the MFP 1 (step S606).

If the print server 3 cannot receive the specific information that requires the reception of the IP address of the MFP 1 during a predetermined period, there is a high possibility that the exclusive cable 7 is not connected. In such a case, it is determined as time-out, and the fact is displayed as an error message (step S605). A fixed period such as 10 seconds, 1 minute, 2 minutes, etc. is set as the time-out period beforehand.

Setting the IP address of the MFP 1 in the step S606, the print server 3 transmits the IP address of the print server 3 with the setup IP address of the MFP 1 being destination (step S607).

Next, in step S608, the MFP 1 receives the IP address of the print server 3 transmitted in the step S607.

If the MFP 1 cannot receive the IP address of the print server 3 during a predetermined period, there is a high possibility that a network cable is not connected or the exclusive cable 7 is not connected. In such a case, the MFP 1 determines as time-out. And the MFP 1 displays the fact as an error message (step S609). A fixed period such as 10 seconds, 1 minute, 2 minutes, etc. is set as the time-out period beforehand.

FIG. 7 is a view showing a third display example of the operation unit 303 of the MFP 1 in FIG. 3, and it is an example of a screen displayed in the step S609 in FIG. 6B.

In the step S609 in FIG. 6B, the MFP 1 displays an error message 701, as shown in FIG. 7. Then, the MFP 1 urges the user to check whether the MFP 1 and the print server 3 are correctly connected to the network 6, and whether the exclusive cable 7 is connected correctly.

Receiving the IP address of the print server 3 in the step S608, the MFP 1 sets up the IP address of the print server 3 (step S610). And the process is finished.

It should be noted that the steps S603, S604, S601, and S602 are examples of a first receiving unit, a second receiving unit, a first transmission unit, and a second transmission unit in this embodiment, respectively. The step S607 is a transmission unit that transmits the own address to the setup address (IP address).

According to the above-mentioned method, since the MFP 1 requires the reception of the IP address to the print server 3 using the exclusive cable 7 before the MFP 1 transmits the IP address by the broadcast packet, the print server 3 can receive the IP address of the MFP 1. Therefore, the MFP 1 automatically recognizes and sets up the IP address of the print server 3, and the print server 3 automatically recognizes and sets up the IP address of the MFP 1.

In this embodiment, the MFP 1 requires the reception of the IP address to the print server 3 before the MFP 1 transmits the IP address by the broadcast packet. However, the print server 3 may require the reception to the MFP 1.

That is, the same effect can be obtained by a method by which the print server 3 requires a reception of the IP address to the MFP 1 before the print server 3 transmits the IP address by the broadcast packet, and by which the MPF 1 receives the IP address.

In the first embodiment, the method of setting the IP address correctly by transmitting the specific information that requires reception from the MFP to the print server beforehand for the MFP and the print server that are connected to the network 6 has been described.

However, this method may not be able to set up the IP addresses correctly between the MFP and the print server actually connected by the exclusive cable, when two print servers that are provided with the same function start setups of IP addresses on the network simultaneously. Therefore, a second embodiment that avoids the above problem will be described.

Figure 8:
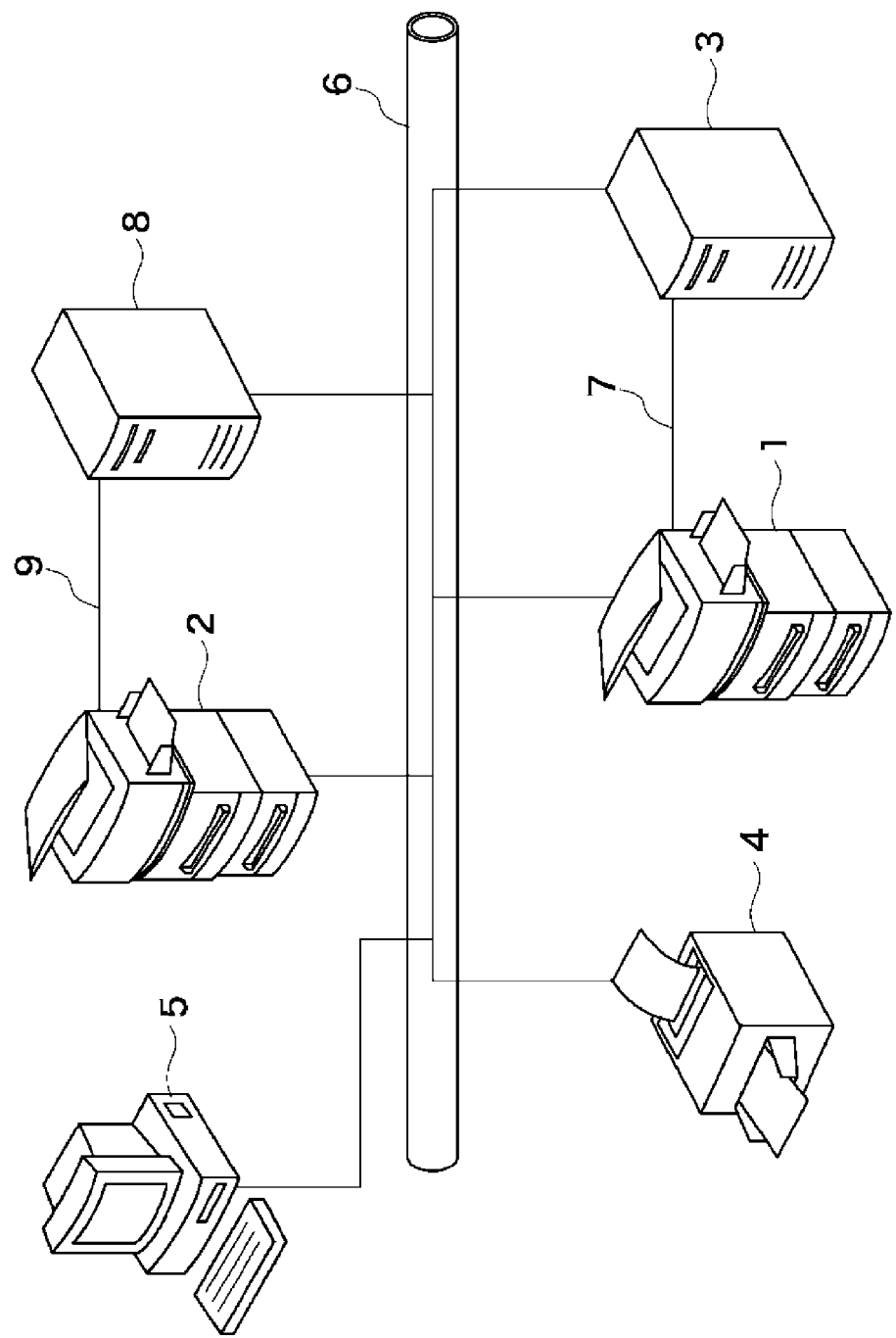
FIG. 8 is a configuration view schematically showing a network system in which an information processing apparatus and an image processing apparatus concerning a second embodiment of the present invention are connected to a network.

FIG. 8 is a configuration view schematically showing a network system in which an information processing apparatus and an image processing apparatus concerning the second embodiment of the present invention are connected to a network.

This network system of FIG. 8 is provided with multifunction printers (MFPs) 1 and 2 as image processing apparatuses provided with functions such as a print function, a copy function, a facsimile function, and a scan function.

Moreover, the network system is provided with a print server 3 as the information processing apparatus that extends the functions of the MFP 1 by cooperating with the MFP 1, and a print server 8 as the information processing apparatus that extends the functions of the MFP 2 by cooperating with the MFP 2.

The network system is provided with a printer 4 and an information terminal 5 such as a PC. These are mutually connected via a network 6 such as the Ethernet (registered trademark).

The information terminal 5 is accessible to the printer 4, the MFPs 1 and 2, and the print server 3 via the network 6. The MFP 1 and the print server 3 are connected via an exclusive cable 7, and the MFP 2 and the print server 8 are connected via an exclusive cable 9.

Although the MFP 1 and the print server 3 are independent in FIG. 8, the MFP 1 and the print server 3 may be unified. Although the MFP 2 and the print server 8 are independent, the MFP 2 and the print server 8 may be unified.

Hereafter, the MFP 1 and the print server 3 will be described as an example.

Since block diagrams showing inner configurations of the MFP 1 and the print server 3, operation units, operations until starting connection setting are common to the first embodiment, duplicate descriptions will be omitted.

Figure 9B:
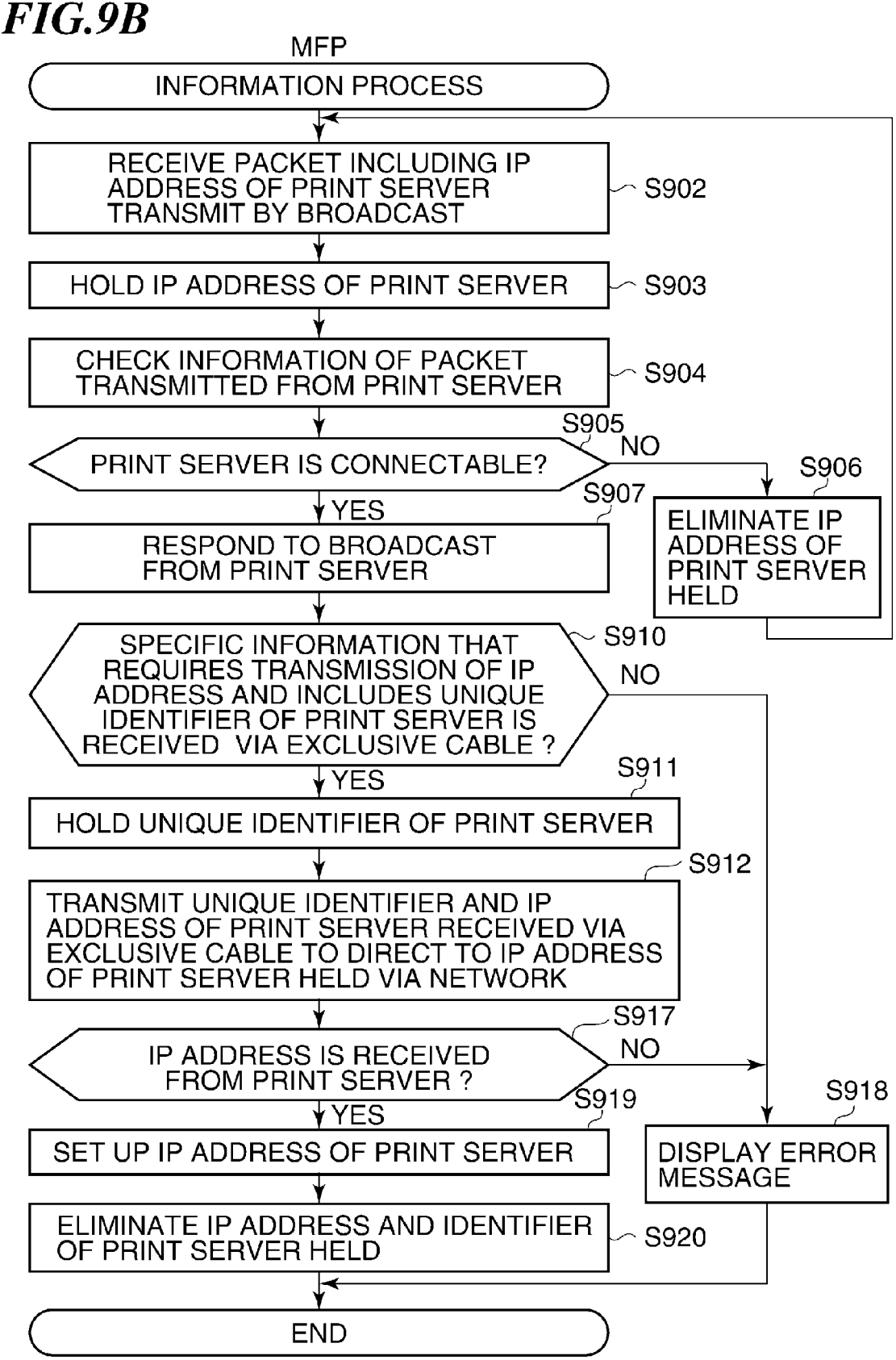
FIG. 9B is a flowchart showing procedures of an information process executed by the MFP in FIG. 8.
Figure 10:
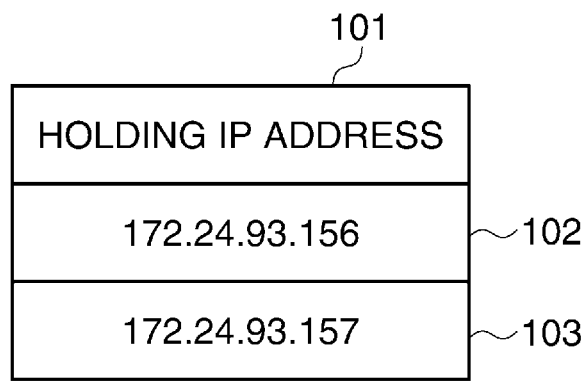
FIG. 10 is a view showing a holding IP address list of the print server in FIG. 8.
Figure 11:
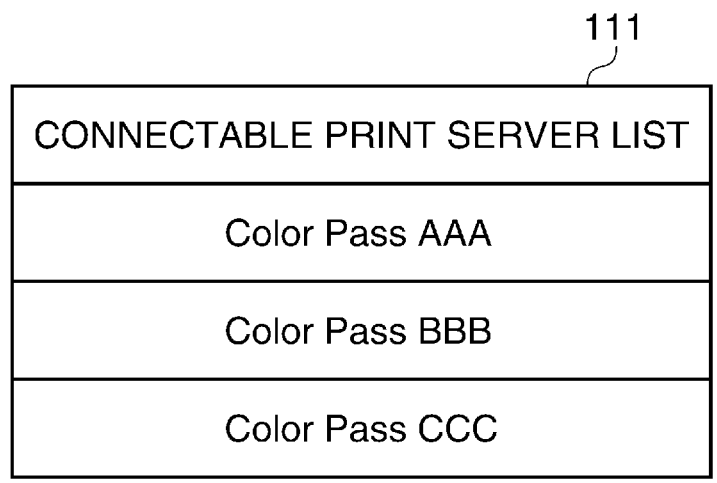
FIG. 11 is a view showing a connectable print server list in the network system of FIG. 8.
Figure 12:
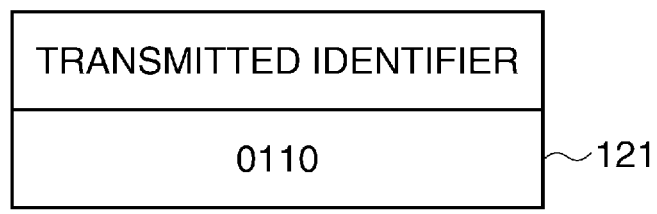
FIG. 12 is a view showing an identifier transmitted from the print server in FIG. 8.

FIG. 9A and FIG. 9B are flowcharts showing procedures of an information process executed by the print server 3 and the MFP 1 in FIG. 8. FIG. 10 is a view showing a holding IP address list 101 of the print servers 3 and 8 in FIG. 8. FIG. 11 is a view showing a connectable print server list 111 in the network system of FIG. 8. FIG. 12 is a view showing an identifier 121 transmitted from the print server 3 in FIG. 8.

FIG. 9A and FIG. 9B show the processes for automatically setting the mutual IP addresses so that the print server 3 can correctly communicate with the MFP 1 in the case when the print server 3 is newly installed into the environment where the MFP 1 has already worked in the network 6 and is connected with the MFP 1 by the exclusive cable 7.

It is assumed that the MFP 1 and the print server 3 have already acquired the IP addresses individually. When there is a DHCP server on the network 6, the IP addresses are automatically assigned from the DHCP server. Fixed IP addresses may be assigned to the MFP 1 and the print server 3 beforehand.

Next, the print server 3 transmits information (a product name in this embodiment) showing a type (a model) of the print server 3 that also includes the IP address 102 of the print server 3 by the broadcast packet. And the print server 3 searches an MFP of the connectable type connected to the network 6 (step S901).

It is assumed that the IP address 102 of the print server 3 is "172.24.93.156" and the product name is "Color Pass BBB". The broadcast packet transmitted is transmitted not only to the MFP 1 but also to the MFP 2, the printer 4, and the printer server 8 that are connected to the network 6.

At the time, the print server 8 also transmits a broadcast packet to search an MFP of the connectable type connected to the network 6. It is assumed that the IP address 103 of the print server 8 is "172.24.93.157" and the product name is "ColorPass CCC". The broadcast packet transmitted is transmitted not only to the MFP 2 but also to the MFP 1, the printer 4, and the printer server 3 that are connected to the network 6.

Receiving the IP addresses including the search information of the print servers 3 and 8 in the step S902, the MFP 1 holds the IP address 102 of the print server 3 and the IP address 103 of the print server 8 in the holding IP address list 101 (step S903, a first holding unit). The holding IP address list 101 is stored in a hard disk 307.

The MFP 1 stores the connectable print server list 111 in the hard disk 307, and lists and manages the product names of the connectable print servers.

The MFP 1 checks the received product name of the print server against the connectable print server list 111 (step S904), and determines whether the print server 3 is connectable or not (step S905).

Since the product name of the print server 3 transmitted from the print server 3 is "Color Pass BBB", and the product name is held in the connectable print server list 111 shown in FIG. 11, the MFP 1 determines that the print server 3 is connectable.

Since the product name of the print server 8 transmitted from the print server 8 is "Color Pass CCC", and the product name is held in the connectable print server list 111 shown in FIG. 11, the MFP 1 determines that the print server 8 is also connectable.

The MFP 1 transmits responses to the print server 3 and the print server 8 to show they are connectable (step S907).

In step S906, the MFP 1 eliminates the IP address of the print server held in step S903, when the received product name of the print server is not held in the connectable print server list 111 and the MFP 1 determines that the print server is not connectable in the step S905.

Receiving the response transmitted from the MFP 1 in step S908, the print server 3 transmits specific information that requires transmission of the IP address of the MFP 1 to the MFP 1 using the exclusive cable 7 used for connection with the MFP 1 (step S909).

The specific information includes a unique identifier that only the print server 3 has. For example, the unique identifier is generated by a small-scale hardware circuit that is arranged in the interface for the exclusive cable 7 and outputs fixed data and a random number, or unique data (serial ID etc.) that the print server has is used as the unique identifier.

In this embodiment, the print server 3 has a hardware circuit that is arranged in the interface for the exclusive cable 7 and generates 4-bit fixed data string "0110" as the unique identifier.

In step S910 (the second receiving unit), the MFP 1 receives the specific information that requires transmission of the IP address and the unique identifier that has been transmitted from the print server 3 (issued by the print server 3) via the exclusive cable 7. The received specific information holds the identifier 121 transmitted as shown in FIG. 12 (step S911, the second holding unit).

If the MFP 1 cannot receive the specific information that requires transmission of the IP address and the unique identifier transmitted from the print server 3 during a predetermined period, there is a high possibility that the exclusive cable 7 is not connected. In such a case, the MFP 1 determines as time-out. And the MFP 1 displays the fact as an error message (step S918). A fixed period such as 10 seconds, 1 minute, 2 minutes, etc. is set as the time-out period beforehand.

The MFP 1 displays the error message (FIG. 7) and urges the user to check whether the exclusive cable 7 that connects the MFP 1 and the print server 3 is connected correctly.

As mentioned above, the MFP 1 holds the IP address 102 of the print server 3 and the IP address 103 of the print server 8 in the holding IP address list 101 in the step S903.

Therefore, the MFP 1 transmits the unique identifier 121 transmitted from the print server 3 and the IP address of the MFP 1 with the IP address 102 of the print server 3 and the IP address 103 of the print server 8 being destination via the network 6 (step S912). The unique identifier 121 is fixed data or variable data.

Next, the print server 3 receives the IP address of the MFP 1 and the unique identifier 121 of the print server 3 from the MFP 1 in step S913.

And the print server 3 determines whether the unique identifier 121 of the print server 3 transmitted from the MFP 1 is identical to what the print server 3 transmitted to the MFP 1 in the step S909 (step S914).

When it is determined as identical, the print server 3 sets up the IP address of the MFP 1 received (step S915), and transmits the IP address of the print server 3 with the IP address of the MFP 1 being destination (step S916, a third transmission unit).

The print server 8 also receives the IP address of the MFP 1 and the unique identifier 121 of the print server 3 from the MFP 1 similarly. However, since it is determined that the unique identifier 121 of the print server 3 transmitted from the MFP 1 differs from the unique identifier that the print server 8 has, the print server 8 does not proceeds to the process for setting the IP address of the MFP 1.

When receiving the IP address of the print server 3 (step S917, the third receiving unit), the MFP 1 sets up the IP address 102 of the print server 3 (step S919). Then, the MFP 1 eliminates the IP address 102 of the print server 3 and the unique identifier 121 of the print server 3 that have been held (step S920).

If the MFP 1 cannot receive the IP address of the print server 3 from the print server 3 during a predetermined period, there is a high possibility that the network cable is not connected. In such a case, the MFP 1 determines as time-out, and displays the fact as an error message (the step S918).

A fixed period such as 10 seconds, 1 minute, 2 minutes, etc. is set as the time-out period beforehand. The MFP 1 displays the error message (FIG. 7) and urges the user to check whether the MFP 1 and the print server 3 are connected to the network 6 correctly.

As mentioned above, in this embodiment, even when a plurality of print servers execute the process in the step S901 simultaneously, it is possible to set up an IP address correctly. Since the print server transmits the unique identifier of the print server to the connected MFP via the exclusive cable 7, and the response from the MFP includes the identifier, the print server can determine whether the response has been transmitted from the MFP that is actually connected via the exclusive cable 7.

It is assumed that the MFP 2 and the MFP 1 receive the IP addresses of both of the print server 8 and the print server 3 simultaneously in the step S902 and hold the IP addresses in the step S903. The print server 8 and the print server 3 transmits the unique identifiers, which are different to each other, to the MFP 2 and the MFP 1, respectively, in the step S909.

And in step S912, when the MFP 1 and the MFP 2 respond to the print server 3 and the print server 8, respectively, the MFP 1 and the MFP 2 give the different unique identifiers and respond.

Therefore, in the step S914, the print server 8 can determine that only the response transmitted by the MFP 2 is a response from a correct connecting destination, and the print server 3 can determine that only the response transmitted by the MFP 1 is a response from a correct connecting destination. Accordingly, the print server 3 and the print server 8 can set up the IP addresses correctly.

When the exclusive cable 7 between the MFP 1 and the print server 3 is not connected accidentally, it can prevent that a wrong IP address sets up. Next, a case where the print server 3 and the print server 8 execute packet transmission simultaneously in the step S901 will be described as an example.

Since the MFP 2 transmits a response packet with the unique identifier transmitted from the print server 8, when the print server 3 receives the response packet, the print server 3 can determine that the identifier included in the response packet is not transmitted by the print server 3 (the step S914).

Therefore, the print server 3 does not transmit the IP address of the print server 3 to the MFP 1, and the MFP 1 does not receive the IP address from the print server 3 in the step S917 and displays the error message 131 as shown in FIG. 7 (the step S918).

As mentioned above, even when the print server 3 and the print server 8 execute the process in the step S901 simultaneously, the MFP 1 can set up the IP address of the print server 3, and the print server 3 can set up the IP address of the MFP 1. Further, the MFP 2 can set up the IP address of the print server 8, and the print server 8 can set up the IP address of the MFP 2.

Other Embodiments

In the above-mentioned embodiments, although the MFP is described as an example of the image processing apparatus, another apparatus such as a printer, a copier, a scanner, or a facsimile may be used as the image processing apparatus. Concerning the data transmission method using the broadcast, another transmission method such as a multicast or the like can be used as long as the transmission method allows transmitting data to a plurality of network nodes.

In the above-mentioned embodiments, although the setting of the IP address in the environment of the TCP/IP protocol has been described as the example, the address setting method of the present invention is not limited to the setting of the IP address only. The method of the present invention is applicable to another address that is used for communication between nodes in a protocol environment other than the TCP/IP.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-035402, filed on Feb. 18, 2009, which is hereby incorporated by reference herein in its entirety.

What is claimed is:

1. An information processing system, comprising:
a first information processing apparatus; and
a second information processing apparatus, wherein said first information processing apparatus and said second information processing apparatus can communicate with each other via a network, said first information processing apparatus and said second information processing apparatus are directly connected with each other by a predetermined cable, said predetermined cable is separate from and independent of the network, said first information processing apparatus comprises
a first transmitting unit configured to transmit specific information on communication setting to said second information processing apparatus via the predetermined cable, and
a second transmitting unit configured to transmit an IP address of said first information processing apparatus by a broadcast packet via the network, and
said second information processing apparatus comprises
a first receiving unit configured to receive the specific information from said first information processing apparatus via the predetermined cable,
a second receiving unit configured to receive the IP address transmitted from said first information processing apparatus via the network, and
a performing unit configured to, in a case where the first receiving unit has received the specific information via the predetermined cable and the second receiving unit has received the IP address via the network, perform the communication setting based on the IP address received by the second receiving unit.

2. The information processing system according to claim 1, wherein in a case where the first receiving unit has not received the specific information via the predetermined cable, the performing unit does not perform the communication setting based on the IP address received by the second receiving unit.

3. The information processing system according to claim 2, said second information processing apparatus further comprising a display unit configured to display an error message in a case where the performing unit does not perform the communication setting based on the IP address received by the second receiving unit.

4. The information processing system according to claim 1, wherein after the first transmitting unit has transmitted the specific information via the predetermined cable, the second transmitting unit transmits the IP address via the network.

* * * * *